(12) United States Patent
Kaye

(10) Patent No.: US 7,462,208 B2
(45) Date of Patent: Dec. 9, 2008

(54) PLANAR MICRO FUEL PROCESSOR

(75) Inventor: Ian W. Kaye, Livermore, CA (US)

(73) Assignee: Ultracell Corporation, Livermore, CA (US)

( * ) Notice: Subject to any disclaimer, the term of this patent is extended or adjusted under 35 U.S.C. 154(b) by 644 days.

(21) Appl. No.: 10/877,804

(22) Filed: Jun. 25, 2004

(65) Prior Publication Data

US 2005/0022448 A1  Feb. 3, 2005

Related U.S. Application Data

(60) Provisional application No. 60/482,996, filed on Jun. 27, 2003, provisional application No. 60/483,416, filed on Jun. 27, 2003.

(51) Int. Cl.
*B01J 7/00* (2006.01)
*B01J 8/00* (2006.01)
*H01M 8/06* (2006.01)
*C01B 3/36* (2006.01)
*C10J 3/46* (2006.01)
*C10J 3/54* (2006.01)

(52) U.S. Cl. .......................... 48/127.9; 48/61; 48/197 R
(58) Field of Classification Search ............... 48/127.9, 48/61, 197 R
See application file for complete search history.

(56) References Cited

U.S. PATENT DOCUMENTS

| | | | |
|---|---|---|---|
| 3,119,671 A | 1/1964 | Koniewiez et al. | |
| 3,541,729 A | 11/1970 | Dantowitz | |
| 3,578,952 A | 5/1971 | Boose | |
| 3,595,628 A | 7/1971 | Connor et al. | |
| 4,522,894 A | 6/1985 | Hwang et al. | |
| 5,081,095 A | 1/1992 | Bedford et al. | |
| 5,209,906 A * | 5/1993 | Watkins et al. | 422/200 |
| 5,525,436 A | 6/1996 | Savinell et al. | |
| 5,534,328 A | 7/1996 | Ashmead et al. | 428/166 |
| 5,601,938 A | 2/1997 | Mayer et al. | |
| 5,611,214 A | 3/1997 | Wegeng et al. | |
| 5,641,585 A | 6/1997 | Lessing et al. | |

(Continued)

FOREIGN PATENT DOCUMENTS

DE  19841993  3/2000

(Continued)

OTHER PUBLICATIONS

S. Ahmed et al., "Catalytic Partial Oxidation Reforming of Hydrocarbon Fuels", Nov. 16-19, 1998, 1998 Fuel Cell Seminar, Palm Springs, CA.

(Continued)

*Primary Examiner*—Alexa D Neckel
*Assistant Examiner*—Matthew J Merkling
(74) *Attorney, Agent, or Firm*—Beyer Law Group LLP

(57) ABSTRACT

Described herein is a fuel processor that produces hydrogen from a fuel source. The fuel processor comprises a reformer, boiler and burner. The reformer includes a catalyst to facilitate the production of hydrogen from the fuel source. A boiler heats the fuel source before receipt by the reformer. The burner provides heat to the reformer and to the boiler. The fuel processor may also comprise a dock that maintains position of the reformer and boiler within the fuel processor. Dewars are also described that improve thermal management of a fuel processor by reducing heat loss and increasing burner efficiency.

28 Claims, 8 Drawing Sheets

SECTION A-A

U.S. PATENT DOCUMENTS

| | | |
|---|---|---|
| 5,716,727 A | 2/1998 | Savinell et al. |
| 5,733,347 A | 3/1998 | Lesieur |
| 5,789,093 A | 8/1998 | Malhi ........................... 429/34 |
| 5,811,062 A | 9/1998 | Wegeng et al. |
| 5,961,930 A | 10/1999 | Chatterjee et al. ........... 422/130 |
| 5,961,932 A | 10/1999 | Ghosh et al. ................. 422/193 |
| 6,077,620 A | 6/2000 | Pettit |
| 6,080,501 A | 6/2000 | Kelley et al. |
| 6,193,501 B1 | 2/2001 | Masel et al. |
| 6,200,536 B1 | 3/2001 | Tonkovich et al. |
| 6,245,214 B1 | 6/2001 | Rehg et al. |
| 6,268,077 B1 | 7/2001 | Kelley et al. |
| 6,312,846 B1 | 11/2001 | Marsh |
| 6,406,808 B1 | 6/2002 | Pratt et al. |
| 6,415,860 B1 | 7/2002 | Kelly et al. |
| 6,423,434 B1 | 7/2002 | Pratt et al. |
| 6,460,733 B2 | 10/2002 | Acker et al. |
| 6,465,119 B1 | 10/2002 | Koripella et al. |
| 6,470,569 B1 | 10/2002 | Lippert et al. .................. 29/890 |
| 6,537,506 B1 | 3/2003 | Schwalbe et al. ............ 422/130 |
| 6,541,676 B1 | 4/2003 | Franz et al. ................... 585/250 |
| 6,569,553 B1 | 5/2003 | Koripella et al. ............... 429/20 |
| 6,638,654 B2 | 10/2003 | Jankowski et al. |
| 6,673,130 B2 | 1/2004 | Jankowski et al. |
| 6,753,036 B2 | 6/2004 | Jankowski et al. |
| 6,770,106 B1 | 8/2004 | Okomato et al. |
| 6,810,899 B2 | 11/2004 | Franz et al. .................... 137/79 |
| 6,821,666 B2 | 11/2004 | Morse et al. |
| 6,911,193 B2 | 6/2005 | Allison et al. |
| 6,932,958 B2 | 8/2005 | Wangerow et al. |
| 6,939,632 B2 | 9/2005 | Arana et al. ................... 429/17 |
| 7,014,835 B2 | 3/2006 | Mathias et al. |
| 7,056,477 B1 * | 6/2006 | Schwalbe et al. ............ 422/129 |
| 7,115,148 B2 | 10/2006 | Wheeldon et al. |
| 7,214,251 B2 | 5/2007 | Oh et al. |
| 7,276,096 B2 | 10/2007 | Kaye et al. |
| 2001/0029974 A1 | 10/2001 | Cohen et al. |
| 2002/0012825 A1 | 1/2002 | Sasahara et al. |
| 2002/0045082 A1 | 4/2002 | Marsh |
| 2002/0076599 A1 | 6/2002 | Neutzler et al. |
| 2002/0081468 A1 | 6/2002 | Shioya |
| 2002/0094462 A1 | 7/2002 | Shioya et al. |
| 2002/0098119 A1 | 7/2002 | Goodman |
| 2002/0106540 A1 | 8/2002 | Shioya |
| 2002/0127141 A1 | 9/2002 | Acker |
| 2002/0131915 A1 | 9/2002 | Shore et al. |
| 2002/0132156 A1 | 9/2002 | Ruhl et al. |
| 2002/0147107 A1 | 10/2002 | Abdo et al. |
| 2002/0150804 A1 | 10/2002 | Srinivasari et al. |
| 2002/0155335 A1 | 10/2002 | Kearl |
| 2002/0192537 A1 | 12/2002 | Ren |
| 2003/0006668 A1 | 1/2003 | Lai et al. |
| 2003/0027022 A1 | 2/2003 | Arana et al. ................... 429/17 |
| 2003/0031910 A1 | 2/2003 | Satou et al. .................... 429/30 |
| 2003/0031913 A1 | 2/2003 | Pavio et al. |
| 2003/0057199 A1 | 3/2003 | Villa et al. |
| 2003/0091502 A1 | 5/2003 | Holladay et al. |
| 2003/0129464 A1 | 7/2003 | Becerra et al. |
| 2003/0190508 A1 | 10/2003 | Takeyama et al. .............. 429/20 |
| 2003/0194363 A1 | 10/2003 | Koripella |
| 2004/0009381 A1 | 1/2004 | Sakai et al. |
| 2004/0025784 A1 | 2/2004 | Kawamura et al. ........... 117/200 |
| 2004/0028602 A1 | 2/2004 | Franz et al. ................. 423/648.1 |
| 2004/0043263 A1 | 3/2004 | Takeyama et al. .............. 429/19 |
| 2004/0062961 A1 | 4/2004 | Sato et al. ..................... 429/19 |
| 2004/0065013 A1 | 4/2004 | DeVries ..................... 48/198.2 |
| 2004/0105789 A1 | 6/2004 | Yamamoto .................. 422/130 |
| 2004/0228211 A1 | 11/2004 | Koripella et al. ............. 366/341 |
| 2005/0011125 A1 | 1/2005 | Kaye et al. |
| 2005/0115889 A1 | 6/2005 | Schaevitz et al. ........... 210/490 |

FOREIGN PATENT DOCUMENTS

| | | |
|---|---|---|
| JP | 06-310166 A | 11/1994 |
| JP | 2003048701 | 2/2003 |
| JP | 2003290649 | 10/2003 |
| JP | 2003290653 | 10/2003 |
| JP | 2003340273 | 12/2003 |
| JP | 2004057920 | 2/2004 |
| WO | WO 00/45457 | 8/2000 |
| WO | WO0147800 | 7/2001 |
| WO | WO02/19452 | 3/2002 |
| WO | WO 02/059993 | 8/2002 |
| WO | WO 02/093665 | 11/2002 |
| WO | WO 02/103832 | 12/2002 |
| WO | WO 02/103878 | 12/2002 |
| WO | WO03/082460 | 10/2003 |
| WO | WO03/083984 | 10/2003 |
| WO | WO 2004/030805 | 4/2004 |
| WO | WO2004/037406 | 5/2004 |

OTHER PUBLICATIONS

A.R. Boccaccini et al., "Electrophoretic Deposition of Nanoceramic Particles onto Electrically Conducting Fibre Fabrics", Sep. 21-24, 1998, 43$^{rd}$ International Scientific Colloquium, Technical Universisty of Ilmenau.

J. Bostaph et al., "1W Direct Methanol Fuel Cell System as a Desktop Charger", Oct. 14, 2002, Motorola Labs, Tempe, AZ.

K. Brooks et al., "Microchannel Fuel Processing, Fuel Cells for Transportation/Fuels for Fuel Cells", May 6-10, 2002, 2002 Annual Program/Lab R&D Review, Pacific Northwest National Laboratory.

M.J. Castaldi et al., "A Compact, Lightweight, Fast-Response Preferential Oxidation Reactor for PEM Automotive Fuel Cell Applications", Sep. 6, 2002, Precision Combustion, Inc., North Haven, CT.

S. Ehrenberg et al., "One Piece Bi-Polar (OPB) Plate with Cold Plate Cooling", Dec. 13, 2002, Session PEM R&D II (2A), Dais Analytic—Rogers.

T.M. Floyd et al., "Liquid-Phase and Multi-Phase Microreactors for Chemical Synthesis", Jun. 1999, Massachusetts Institute of Technology, Cambridge, MA.

A.J. Franz et al., "High Temperature Gas Phase Catalytic and Membrane Reactors", Jun. 1999, Massachusetts Institute of Technology, Cambridge, MA.

J.D. Holladay et al., "Miniature Fuel Processors for Portable Fuel Cell Power Supplies", Nov. 26, 2002, Battelle Pacific Northwest Division, Richland, WA.

S.W. Janson et al., "MEMS, Microengineering and Aerospace Systems", 1999, The American Institute of Aeronautics and Astronautics, Inc.

J. Kaschmitter et al., "Micro-Fabricated Methanol/Water Reformers for Small PEM Fuel Cell Systems", Jul. 21-24, 2003, 8$^{th}$ Electrochemical Power Sources R&D Symposium, Portsmouth, VA.

K. Keegan et al., "Analysis for a Planar Solid Oxide Fuel Cell Based Automotive Auxiliary Power Unit", Mar. 2-7, 2002, SAE 2002 World Congress, Detroit, MI.

K. Kempa et al., "Photonic Crystals Based on Periodic Arrays of Aligned Carbon Nanotubes", Oct. 3, 2002, Nano Letters 2003, vol. 3, No. 1, 13-18.

R. Kumar et al., "Solid Oxide Fuel Cell Research at Argonne National Laboratory", Mar. 29-30, 2001, 2$^{nd}$ Solid Sate Energy Conversion Alliance Workshop, Arlington, VA.

S.H. Lee et al., "Removal of Carbon Monoxide from Reformate for Polymer Electrolyte Fuel Cell Application", Nov. 16-19, 1998, 1998 Fuel Cell Seminar, Palm Springs, CA.

Q. Li et al., "The CO Poisoning Effect in PEMFCs Operational at Temperatures up to 200° C", 2003, Journal of The Electrochemical Society, 150 (12) A1599-A1605.

D. Myers et al., "Alternative Water-Gas Shift Catalysts", Jun. 7-8, 2000, 2000 Annual National Laboratory R&D Meeting, DOE Fuel Cells for Transportation Program, Argonne National Laboratory.

D.R. Palo et al., "Development of a Soldier-Portable Fuel Cell Power System, Part I: A Bread-Board Mehtanol Fuel Processor", 2002, Journal of Power Sources 108 (2002) 28-34.

A. Pattekar et al., "A Microreactor for In-situ Hydrogen Production by Catalytic Methanol Reforming", May 27-30, 2001, Proceedings of the 5th International Conference on Microreaction Technology.

A. Pattekar et al., "Novel Microfluidic Interconnectors for High Temperature and Pressure Applications", 2003, Journal of Micromechanics and Microengineering, 13, 337-345.

D. Prater et al., "Systematic Examination of a Direct Methanol-Hydrogen Peroxide Fuel Cell", Sep. 22, 2001, Swift Enterprises, Ltd., Lafayette, IN.

W. Ruettinger et al., "A New Generation of Water Gas Shift Catalysts for Fuel Cell Applications", 2003, Journal of Power Sources, 118, 61-65.

O. Savadogo et al., Hydrogen/Oxygen Polymer Electrolyte Membrane Fuel Cell (PEMFC) Based on Acid-Doped Polybenzimidazole (PBI), 2000, Journal of New Materials for Electrochemical Systems, 3, 345-349.

R.F. Savinell et al., "High Temperature Polymer Electrolyte for PEM Fuel Cells", Sep. 4, 2002, Department of Chemical Engineering, Case Western Reserve University.

R. Srinivasan et al., "Micromachined Reactors for Catalytic Partial Oxidation Reactions", Nov. 1997, AIChe Journal, vol. 43, No. 11, 3059-3069.

S. Swartz et al., "Ceria-Based Water-Gas-Shift Catalysts", Aug. 1, 2003, NexTech Materials, Ltd., Wolrthington, OH.

S. Tasic et al., "Multilayer Ceramic Processing of Microreactor Systems", Oct. 14, 2002, Motorola Labs, Tempe, AZ.

V. Tomašić et al., "Development of the Structured Catalysts for the Exhaust Gas Treatment", 2001, Chem. Biochem. Eng. Q. 15 (3), 109-115.

TIAX LLC, "Advanced Hydrogen Storage: A System's Perspective and Some Thoughts on Fundamentals", Aug. 14-15, 2002, Presentation for DOE Workshop on Hydrogen Storage, Cambridge, MA.

Wan et al., "Catalyst Preparation: Catalytic Converter", Feb. 19, 2003, www.insightcentral.net/encatalytic.html.

J. Zalc et al., "Are Noble Metal-Based Water-Gas Shift Catalysts Practical for Automotive Fuel Processing?", 2002, Journal of Catalysis, 206, 169-171.

J. Zizelman et al., "Solid-Oxide Fuel Cell Auxiliary Power Unit: A Paradigm Shift in Electric Supply for Transportation", undated, Delphi Automotive Systems.

"Methanol-Powered Laptops—Cleared for Take-Off", www.silicon.com, Oct. 7, 2002.

Melissa Funk, "Methanol Fuel Quality Specification Study for Proton Exchange Membrane Fuel Cells, Final Report", XCELLSIS, Feb. 2002, 65 pages.

Dr. Detlef zur Megede et al., "MFCA Research Document, Complete", Methanol Fuel Cell Alliance, Sep. 2000, 242 pages.

U.S. Appl. No. 10/131,846, entitled: Microfluidic Fuel Cell Systems with Embedded Materials and Structures and Method Therof, by inventors: Morse, filed Apr. 24, 2002.

U.S. Appl. No. 10/261,353, entitled: Bonded Polymide Fuel Cell Package and Method Therof, by inventors: Morse, filed Sep. 30, 2002.

U.S. Appl. No. 10/371,876, entitled: Metal Hydride Fuel Storage and Method Thereof, by inventors: Morse, filed Oct. 30, 2003.

U.S. Appl. No. 10/612,177, entitled: Vapor-deposited Porous Films for Energy Conversion, by inventors: Jankowski, filed Jan. 27, 2005.

U.S. Appl. No. 10/637,914, entitled: Solid Oxide MEMS-based Fuel Cells, by inventors: Jankowski, filed Mar. 4, 2004.

U.S. Appl. No. 10/637,915, entitled: Solid Polymer MEMS-based Fuel Cells, by inventors: Jankowski, filed Mar. 11, 2004.

U.S. Appl. No. 10/783, 230, entitled: Method for Fabrication of Electrodes, by inventors: Jankowski, filed Aug. 26, 2004.

U.S. Appl. No. 10/853,859, entitled: Microfluidic Systems with Embedded Materials and Structures and Method Thereof, by inventors: Morse, filed Oct. 28, 2004.

U.S. Appl. No. 10/877,769, entitled "Micro Fuel Cell System Start Up and Shut Down Systems and Methods", by inventors: Kay, filed Aug. 25, 2005.

U.S. Appl. No. 10/877,826, entitled "Fuel Preheat in Fuel Cells and Portable Electronics", by inventors: Kaye, filed Jan. 20, 2005.

U.S. Appl. No. 10/877,771, entitled "Efficient Micro Fuel Cell Systems and Methods", by inventors: Kaye, filed Jan. 13, 2005.

U.S. Appl. No. 10/007,412, entitled "Chemical Microreactor and Method Thereof", by inventors: Morse, filed Jun. 5, 2003.

Office Action dated Apr. 16, 2008 from U.S. Appl. No. 11/313,252.

Final Office Action dated Jan. 24, 2008 from U.S. Appl. No. 10/877,044.

* cited by examiner

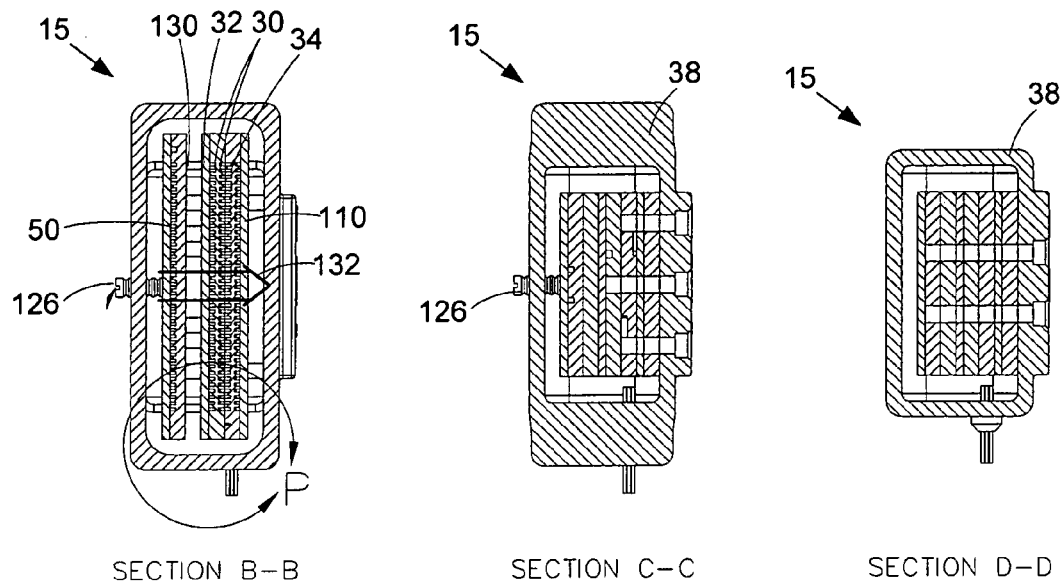
SECTION B-B
FIG. 2G
SECTION C-C
FIG. 2H
SECTION D-D
FIG. 2I
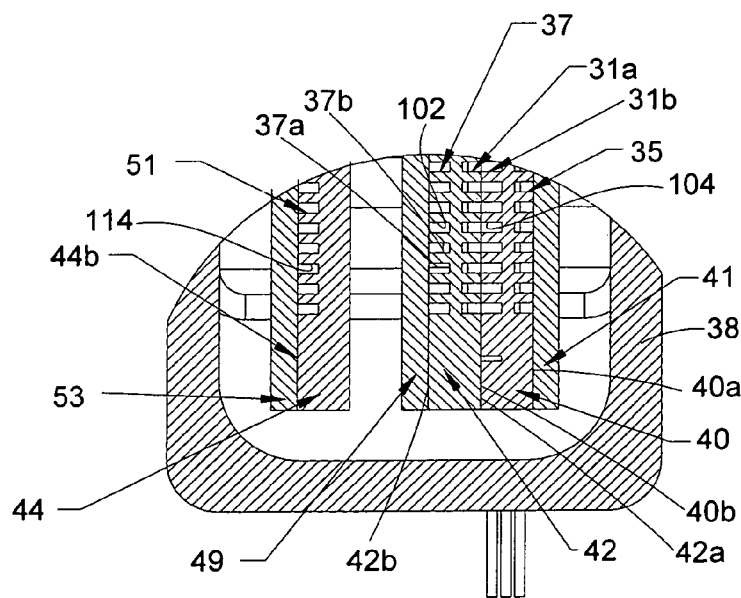
FIG. 2J

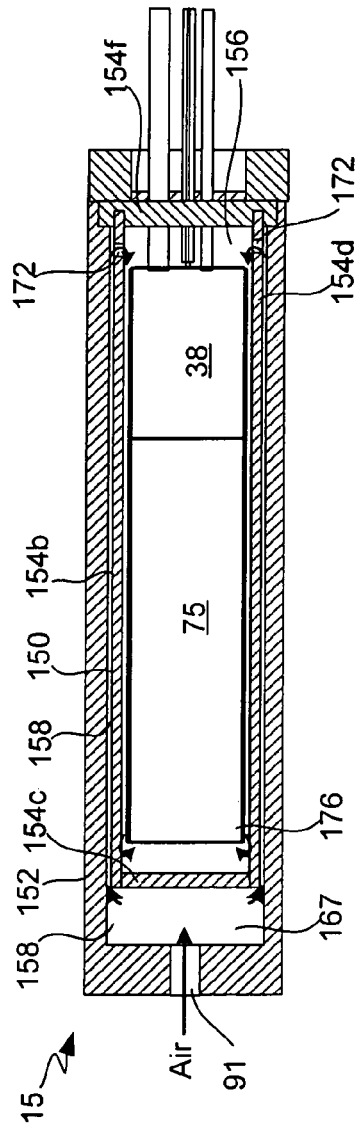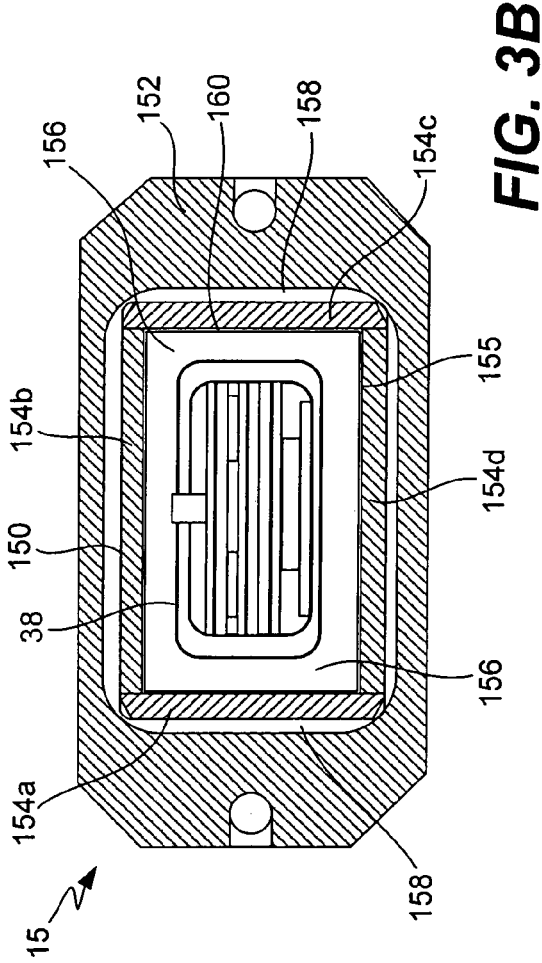

PLANAR MICRO FUEL PROCESSOR

CROSS-REFERENCE TO RELATED APPLICATIONS

This application claims priority under 35 U.S.C. §119(e) from U.S. Provisional Patent Application No. 60/482,996 filed Jun. 27, 2003 entitled "Fuel cell system startup procedure and self-heating apparatus", which is incorporated by reference for all purposes; and also claims priority under 35 U.S.C. §119(e) from U.S. Provisional Patent Application No. 60/483,416 filed Jun. 27, 2003 entitled "Fuel Preheat in Portable Electronics Powered by Fuel Cells", which is incorporated by reference for all purposes.

BACKGROUND OF THE INVENTION

The present invention relates to fuel cell technology. In particular, the invention relates to fuel processors that generate hydrogen and are suitable for use in portable applications.

A fuel cell electrochemically combines hydrogen and oxygen to produce electricity. The ambient air readily supplies oxygen. Hydrogen provision, however, calls for a working supply. Gaseous hydrogen has a low energy density that reduces its practicality as a portable fuel. Liquid hydrogen, which has a suitable energy density, must be stored at extremely low temperatures and high pressures, making storing and transporting liquid hydrogen burdensome.

A reformed hydrogen supply processes a fuel source to produce hydrogen. The fuel source acts as a hydrogen carrier. Currently available liquid fuel sources include methanol, ethanol, gasoline, propane and natural gas. Liquid hydrocarbon fuel sources offer high energy densities and the ability to be readily stored and transported. A fuel processor reforms the hydrocarbon fuel source and to produce hydrogen.

Fuel cell evolution so far has concentrated on large-scale applications such as industrial size generators for electrical power back-up. Consumer electronics devices and other portable electrical power applications currently rely on lithium ion and similar battery technologies. Fuel processors for portable applications such as electronics would be desirable but are not yet commercially available. In addition, techniques that reduce fuel processor size or increase fuel processor efficiency would be highly beneficial.

SUMMARY OF THE INVENTION

The present invention relates to a fuel processor that produces hydrogen from a fuel source. The fuel processor comprises a reformer, boiler and burner. The reformer includes a catalyst to facilitate the production of hydrogen from the fuel source. A boiler heats the fuel source before receipt by the reformer. The burner provides heat to the reformer and to the boiler. The fuel processor may also comprise a dock that maintains the position of the reformer and boiler within the fuel processor. The dock also applies a compliant securing force that holds components of the fuel processor.

Dewars are also described that improve thermal management of a fuel processor by reducing heat loss and increasing burner efficiency. A dewar includes one or more dewar chambers that receive inlet process gases or liquids before a reactor receives them. In one embodiment, the dewar is arranged such that air passing through the dewar chamber intercepts heat generated in the burner before the heat escapes the fuel processor. Passing air through a dewar chamber in this manner performs two functions: a) active cooling of the burner before it reaches outer portions of the fuel processor, and b) heating of the air before receipt by the burner. When the burner relies on catalytic combustion to produce heat, heat generated in the burner warms cool air in the burner according to the temperature of the incoming air. This steals heat from the reformer, reduces heating efficiency of a burner and typically results in greater consumption of the fuel source for catalytic heat generation. The dewar thus pre-heats incoming air before arrival in the burner so the burner loses less heat to the incoming air that would otherwise transfer to the reformer.

In one aspect, the present invention relates to a fuel processor for producing hydrogen from a fuel source. The fuel processor comprises a reformer that includes a set of reformer channels disposed in a first substrate. The reformer also includes a reformer catalyst that facilitates the production of hydrogen from the fuel source. The fuel processor further comprises a boiler including a set of channels disposed in a second substrate and configured to heat the fuel source before the reformer receives the fuel source. The fuel processor also comprises a burner configured to provide heat to the reformer and configured to provide heat to the boiler. The fuel processor additionally comprises a dock configured to maintain position of the reformer and boiler within the fuel processor by applying a compliant securing force that passes through a portion of the first substrate and a portion of the second substrate.

In another aspect, the present invention relates to a fuel processor for producing hydrogen from a fuel source. The fuel processor comprises a reformer that includes a set of reformer channels disposed in a first substrate. The reformer also includes a reformer catalyst that facilitates the production of hydrogen from the fuel source. The fuel processor further comprises a boiler including a set of channels disposed in a second substrate and configured to heat the fuel source before the reformer receives the fuel source. The fuel processor also comprises a catalytic burner including a catalyst that facilitates the production of heat using the fuel source, configured to provide heat to the first substrate and the second substrate, and including a set of channels disposed in one of the first substrate and the second substrate.

In yet another aspect, the present invention relates to a fuel processor for producing hydrogen from a fuel source. The fuel processor comprises a reformer that includes a set of reformer channels disposed in a first substrate. The reformer also includes a reformer catalyst that facilitates the production of hydrogen from the fuel source. The fuel processor further comprises a burner configured to provide heat to the reformer. The fuel processor also comprises a dewar that contains the reformer and the burner and includes a set of dewar walls that form a dewar chamber configured to receive the fuel source or oxygen before the reformer receives the fuel source or oxygen.

These and other features and advantages of the present invention will be described in the following description of the invention and associated figures.

BRIEF DESCRIPTION OF THE DRAWINGS

FIG. 2G illustrates a front cross section of the fuel processor of FIG. 2A taken through line B-B.

FIG. 2H illustrates a front cross section of the fuel processor of FIG. 2A taken through line C-C.

FIG. 2I illustrates a front cross section of the fuel processor of FIG. 2A taken through line D-D.

FIG. 2J illustrates an expanded view of a portion of the shown in FIG. 2G.

FIG. 3A illustrates a side cross-sectional view of a fuel processor and movement of air created by a dewar in accordance with one embodiment of the present invention.

FIG. 3B illustrates a front cross-sectional view of a fuel processor and demonstrates thermal management benefits gained by the dewar.

DETAILED DESCRIPTION OF THE PREFERRED EMBODIMENTS

The present invention is described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1A:
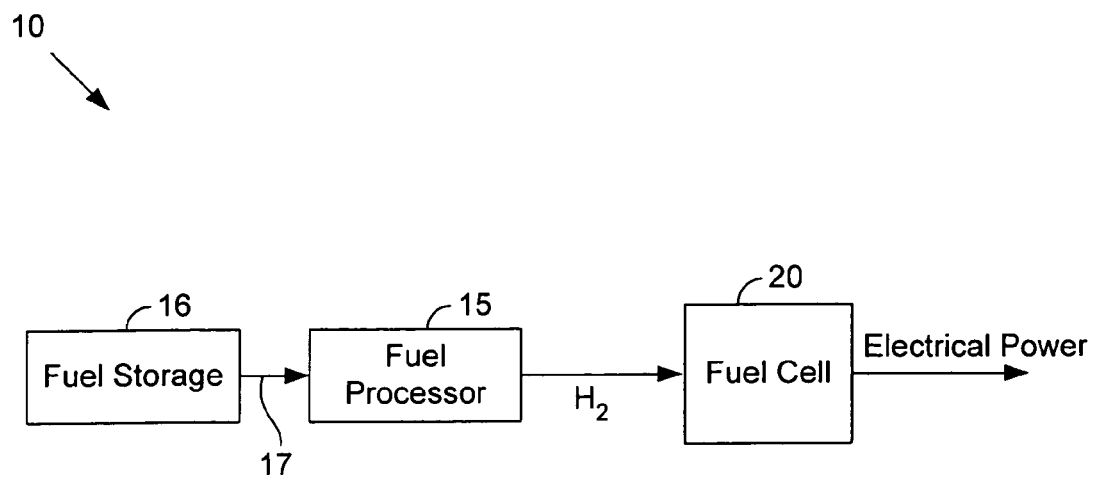
FIG. 1A illustrates a fuel cell system for producing electrical energy in accordance with one embodiment of the present invention.

FIG. 1A illustrates a fuel cell system 10 for producing electrical energy in accordance with one embodiment of the present invention. Fuel cell system 10 comprises storage device 16, fuel processor 15 and fuel cell 20.

A 'reformed' hydrogen supply processes a fuel source to produce hydrogen. As shown, the reformed hydrogen supply comprises a fuel processor 15 and a fuel source storage device 16. Storage device 16 stores fuel source 17, and may include a portable and/or disposable fuel cartridge. A disposable cartridge offers instant recharging to a consumer. In one embodiment, the cartridge includes a collapsible bladder within a hard plastic dispenser case. A separate fuel pump typically controls fuel source 17 flow from storage device 16. If system 10 is load following, then a control system meters fuel source 17 to deliver fuel source 17 to processor 15 at a flow rate determined by the required power level output of fuel cell 20.

Fuel source 17 acts as a carrier for hydrogen and can be processed to separate hydrogen. Fuel source 17 may include any hydrogen bearing fuel stream, hydrocarbon fuel or other hydrogen fuel source such as ammonia. Currently available hydrocarbon fuel sources 17 suitable for use with the present invention include methanol, ethanol, gasoline, propane, butane and natural gas, for example. Several hydrocarbon and ammonia products may also produce a suitable fuel source 17. Liquid fuel sources 17 offer high energy densities and the ability to be readily stored and shipped. Storage device 16 may contain a fuel mixture. When the fuel processor 15 comprises a steam reformer, storage device 16 may contain a fuel mixture of a hydrocarbon fuel source and water. Hydrocarbon fuel source/water fuel mixtures are frequently represented as a percentage fuel source in water. In one embodiment, fuel source 17 comprises methanol or ethanol concentrations in water in the range of 1%-99.9%. Other liquid fuels such as butane, propane, gasoline, military grade "JP8" etc. may also be contained in storage device 16 with concentrations in water from 5-100%. In a specific embodiment, fuel source 17 comprises 67% methanol by volume.

Fuel processor 15 processes the hydrocarbon fuel source 17 and outputs hydrogen. A hydrocarbon fuel processor 15 heats and processes a hydrocarbon fuel source 17 in the presence of a catalyst to produce hydrogen. Fuel processor 15 comprises a reformer, which is a catalytic device that converts a liquid or gaseous hydrocarbon fuel source 17 into hydrogen and carbon dioxide. As the term is used herein, reforming refers to the process of producing hydrogen from a fuel source. Fuel processor 15 may output either pure hydrogen or a hydrogen bearing gas stream. Fuel processor 15 is described in further detail below.

Fuel cell 20 electrochemically converts hydrogen and oxygen to water, generating electricity and heat in the process. Ambient air commonly supplies oxygen for fuel cell 20. A pure or direct oxygen source may also be used for oxygen supply. The water often forms as a vapor, depending on the temperature of fuel cell 20 components. The electrochemical reaction also produces carbon dioxide as a byproduct for many fuel cells.

In one embodiment, fuel cell 20 is a low volume polymer electrolyte membrane (PEM) fuel cell suitable for use with portable applications such as consumer electronics. A polymer electrolyte membrane fuel cell comprises a membrane electrode assembly 40 that carries out the electrical energy generating electrochemical reaction. The membrane electrode assembly 40 includes a hydrogen catalyst, an oxygen catalyst and an ion conductive membrane that a) selectively conducts protons and b) electrically isolates the hydrogen catalyst from the oxygen catalyst. A hydrogen gas distribution layer contains the hydrogen catalyst and allows the diffusion of hydrogen therethrough. An oxygen gas distribution layer contains the oxygen catalyst and allows the diffusion of oxygen and hydrogen protons therethrough. The ion conductive membrane separates the hydrogen and oxygen gas distribution layers. In chemical terms, the anode comprises the hydrogen gas distribution layer and hydrogen catalyst, while the cathode comprises the oxygen gas distribution layer and oxygen catalyst.

A PEM fuel cell often includes a fuel cell stack having a set of bi-polar plates. A membrane electrode assembly is disposed between two bi-polar plates. Hydrogen distribution 43 occurs via a channel field on one plate while oxygen distribution 45 occurs via a channel field on a second facing plate. Specifically, a first channel field distributes hydrogen to the hydrogen gas distribution layer, while a second channel field distributes oxygen to the oxygen gas distribution layer. The 'term 'bi-polar' refers electrically to a bi-polar plate (whether comprised of one plate or two plates) sandwiched between two membrane electrode assembly layers. In this case, the bi-polar plate acts as both a negative terminal for one adjacent membrane electrode assembly and a positive terminal for a second adjacent membrane electrode assembly arranged on the opposite face of the bi-polar plate.

In electrical terms, the anode includes the hydrogen gas distribution layer, hydrogen catalyst and bi-polar plate. The anode acts as the negative electrode for fuel cell 20 and conducts electrons that are freed from hydrogen molecules so that they can be used externally, e.g., to power an external circuit. In a fuel cell stack, the bi-polar plates are connected in series to add the potential gained in each layer of the stack. In electrical terms, the cathode includes the oxygen gas distribution layer, oxygen catalyst and bi-polar plate. The cathode represents the positive electrode for fuel cell 20 and conducts the electrons back from the external electrical circuit to the oxygen catalyst, where they can recombine with hydrogen ions and oxygen to form water.

The hydrogen catalyst separates the hydrogen into protons and electrons. The ion conductive membrane blocks the electrons, and electrically isolates the chemical anode (hydrogen gas distribution layer and hydrogen catalyst) from the chemical cathode. The ion conductive membrane also selectively conducts positively charged ions. Electrically, the anode conducts electrons to a load (electricity is produced) or battery (energy is stored). Meanwhile, protons move through the ion conductive membrane, to combine with oxygen. The protons and used electrons subsequently meet on the cathode side, and combine with oxygen to form water. The oxygen catalyst in the oxygen gas distribution layer facilitates this reaction. One common oxygen catalyst comprises platinum powder very thinly coated onto a carbon paper or cloth. Many designs employ a rough and porous catalyst to increase surface area of the platinum exposed to the hydrogen and oxygen.

In one embodiment, fuel cell 20 comprises a set of bi-polar plates that each includes channel fields on opposite faces that distribute the hydrogen and oxygen. One channel field distributes hydrogen while a channel field on the opposite face distributes oxygen. Multiple bi-polar plates can be stacked to produce a 'fuel cell stack' in which a membrane electrode assembly is disposed between each pair of adjacent bi-polar plates. Since the electrical generation process in fuel cell 20 is exothermic, fuel cell 20 may implement a thermal management system to dissipate heat from the fuel cell. Fuel cell 20 may also employ a number of humidification plates (HP) to manage moisture levels in the fuel cell. Further description of a fuel cell suitable for use with the present invention is included in commonly owned co-pending patent application entitled "Micro Fuel Cell Architecture" naming Ian Kaye as inventor and filed on the same day as this patent application, which is incorporated by reference for all purposes.

While the present invention will mainly be discussed with respect to PEM fuel cells, it is understood that the present invention may be practiced with other fuel cell architectures. The main difference between fuel cell architectures is the type of ion conductive membrane used. In one embodiment, fuel cell 20 is phosphoric acid fuel cell that employs liquid phosphoric acid for ion exchange. Solid oxide fuel cells employ a hard, non-porous ceramic compound for ion exchange and may be suitable for use with the present invention. Generally, any fuel cell architecture may benefit from fuel processor improvements described herein. Other such fuel cell architectures include direct methanol, alkaline and molten carbonate fuel cells.

Fuel cell 20 generates dc voltage that may be used in a wide variety of applications. For example, electricity generated by fuel cell 20 may be used to power a motor or light. In one embodiment, the present invention provides 'small' fuel cells that are designed to output less than 200 watts of power (net or total). Fuel cells of this size are commonly referred to as 'micro fuel cells' and are well suited for use with portable electronics. In one embodiment, fuel cell 20 is configured to generate from about 1 milliwatt to about 200 watts. In another embodiment, fuel cell 20 generates from about 3 W to about 20 W. Fuel cell 20 may also be a stand-alone fuel cell, which is a single unit that produces power as long as it has an a) oxygen and b) hydrogen or a hydrocarbon fuel supply. A fuel cell 20 that outputs from about 40 W to about 100 W is well suited to power a laptop computer.

Figure 1B:
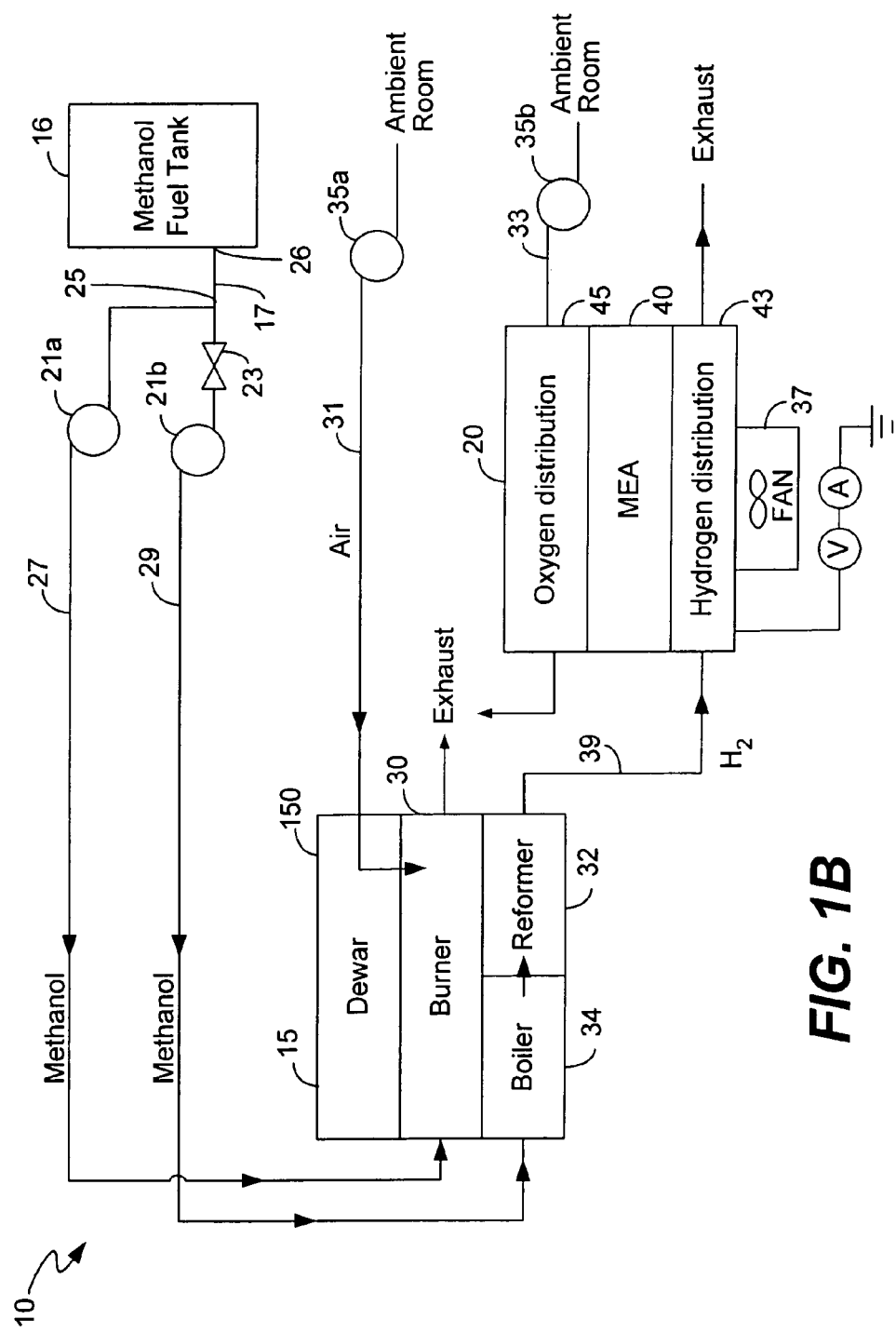
FIG. 1B illustrates schematic operation for the fuel cell system of FIG. 1A in accordance with a specific embodiment of the present invention.

FIG. 1B illustrates schematic operation for fuel cell system 10 in accordance with a specific embodiment of the present invention. As shown, fuel cell system 10 comprises fuel container 16, hydrogen fuel source 17, fuel processor 15, fuel cell 20, multiple pumps 21 and fans 35, fuel lines and gas lines, and one or more valves 23.

Fuel container 16 stores methanol as a hydrogen fuel source 17. An outlet 26 of fuel container 16 provides methanol 17 into hydrogen fuel source line 25. As shown, line 25 divides into two lines: a first line 27 that transports methanol 17 to a burner 30 for fuel processor 15 and a second line 29 that transports methanol 17 to reformer 32 in fuel processor 15. Lines 25, 27 and 29 may comprise plastic tubing, for example. Separate pumps 21a and 21b are provided for lines 27 and 29, respectively, to pressurize the lines and transmit the fuel source at independent rates if desired. A model P625 pump as provided by Instech of Plymouth Meeting, Pa. is suitable to transmit liquid methanol for system 10 is suitable in this embodiment. A flow sensor or valve 23 situated on line 29 between storage device 16 and fuel processor 18 detects and communicates the amount of methanol 17 transfer between storage device 16 and reformer 32. In conjunction with the sensor or valve 23 and suitable control, such as digital control applied by a processor that implements instructions from stored software, pump 21b regulates methanol 17 provision from storage device 16 to reformer 32.

Fan 35a delivers oxygen and air from the ambient room through line 31 to regenerator 36 of fuel processor 15. Fan 35b delivers oxygen and air from the ambient room through line 33 to regenerator 36 of fuel processor 15. In this embodiment, a model AD2005DX-K70 fan as provided by Adda USA of California is suitable to transmit oxygen and air for fuel cell system 10. A fan 37 blows cooling air over fuel cell 20 for cooling.

Fuel processor 15 receives methanol 17 from storage device 16 and outputs hydrogen. Fuel processor 15 comprises burner 30, reformer 32, boiler 34 and dewar 150. Burner 30 includes an inlet that receives methanol 17 from line 27 and a catalyst that generates heat with methanol presence. In one embodiment, burner 30 includes an outlet that exhausts heated gases to a line that transmits the heated gases over heat transfer appendages included in fuel cell 20 to pre-heat the fuel cell and expedite warm-up time needed when initially turning on fuel cell 20. An outlet of burner 30 may also exhaust heated gases into the ambient room.

Boiler 34 includes an inlet that receives methanol 17 from line 29. The structure of fuel processor 15 permits heat produced in burner 30 to heat methanol 17 in boiler 34 before reformer 32 receives the methanol 17. Boiler 34 includes an outlet that provides heated methanol 17 to reformer 32.

Reformer 32 includes an inlet that receives heated methanol 17 from boiler 34. A catalyst in reformer 32 reacts with the methanol 17 and produces hydrogen and carbon dioxide. This reaction is slightly endothermic and draws heat from burner 30. A hydrogen outlet of reformer 32 outputs hydrogen to line 39.

Dewar 150 pre-heats air before the air enters burner 30. Dewar 150 also reduces heat loss from fuel cell 15 by heating the incoming air before it escapes fuel processor 15. In one sense, dewar 150 acts as a regenerator that uses waste heat in fuel processor 15 to increase thermal management and thermal efficiency of the fuel processor. Specifically, waste heat from burner 30 may be used to pre-heat incoming air provided to burner 30 to reduce heat transfer to the air in the burner so more heat transfers to reformer 32. Dewar 150 is described in further detail below.

In one embodiment, fuel processor 15 is a steam reformer that only needs steam to produce hydrogen. Several types of reformers suitable for use in fuel cell system 10 include steam reformers, auto thermal reformers (ATR) or catalytic partial oxidizers (CPOX). ATR and CPOX reformers mix air with the fuel and steam mix. ATR and CPOX systems reform fuels such as methanol, diesel, regular unleaded gasoline and other hydrocarbons. In a specific embodiment, storage device 16 provides methanol 17 to fuel processor 15, which reforms the methanol at about 250° C. or less and allows fuel cell system 10 use in applications where temperature is to be minimized.

Line 39 transports hydrogen from fuel processor 15 to fuel cell 20. Gaseous delivery lines 31, 33 and 39 may comprise plastic tubing, for example. A hydrogen flow sensor (not shown) may also be added on line 39 to detect and communicate the amount of hydrogen being delivered to fuel cell 20. In conjunction with the hydrogen flow sensor and suitable control, such as digital control applied by a processor that implements instructions from stored software, fuel processor 15 regulates hydrogen gas provision to fuel cell 20.

Fuel cell 20 includes an hydrogen inlet port that receives hydrogen from line 39 and delivers it to a hydrogen intake manifold for delivery to one or more bi-polar plates and their hydrogen distribution channels. An oxygen inlet port of fuel cell 20 receives oxygen from line 33 and delivers it to an oxygen intake manifold for delivery to one or more bi-polar plates and their oxygen distribution channels. An anode exhaust manifold collects gases from the hydrogen distribution channels and delivers them to an anode exhaust port, which outlets the exhaust gases into the ambient room. A cathode exhaust manifold collects gases from the oxygen distribution channels and delivers them to a cathode exhaust port.

The schematic operation for fuel cell system 10 shown in FIG. 1B is exemplary and other variations on fuel cell system design, such as reactant and byproduct plumbing, are contemplated. In addition to the components shown in shown in FIG. 1B, system 10 may also include other elements such as electronic controls, additional pumps and valves, added system sensors, manifolds, heat exchangers and electrical interconnects useful for carrying out functionality of system 10 that are known to one of skill in the art and omitted herein for sake of brevity.

Figure 2A:
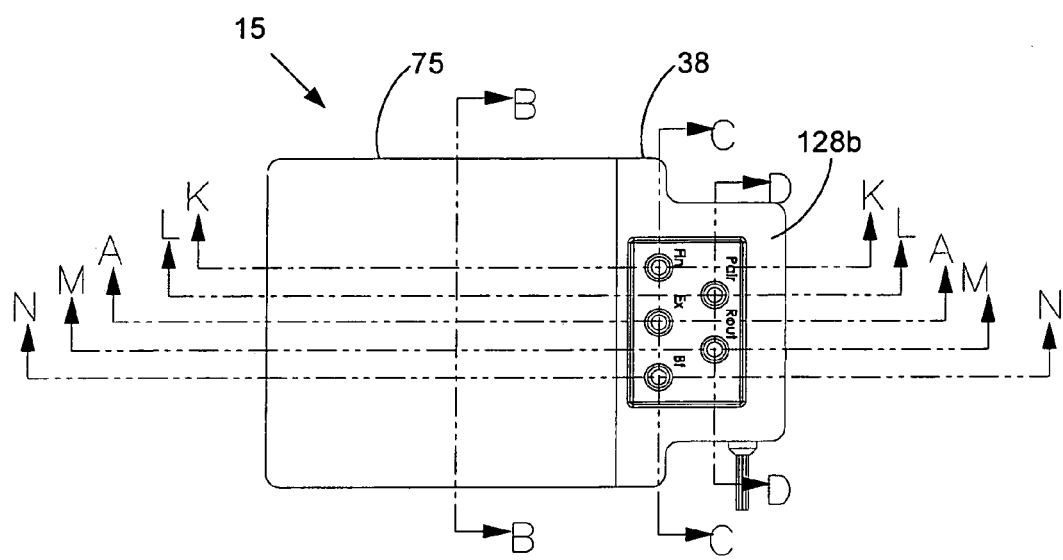
FIG. 2A illustrates a top view of fuel processor in accordance with one embodiment of the present invention.

FIGS. 2A-2J illustrate a fuel processor 15 in accordance with one embodiment of the present invention. FIG. 2A illustrates a top view of fuel processor 15. FIGS. 2B-2F illustrate side cross sections of fuel processor 15 taken at various profiles. FIGS. 2G-2J illustrate front cross sections of fuel processor 15 taken at various profiles. FIG. 2J illustrates an expanded side cross section view of a portion of fuel processor 15 shown in FIG. 2G.

Fuel processor 15 comprises reformer 32, burner 30, boiler 34, dock 38, shell 75, preferential oxidizer 50 and plates 41, 49 and 53 (FIG. 2J). Although the present invention will now be described with respect to methanol consumption for hydrogen production, it is understood that fuel processors of the present invention may consume another fuel source, as one of skill in the art will appreciate.

Fuel processor 15 includes substrates 40, 42 and 44. Each substrate 40, 42 and 44 comprises two substantially planar faces on opposite sides of the substrate. In one embodiment, each substrate 40, 42 and 44 comprises silicon and the set of substrates 40, 42 and 44 is referred to as a 'chipset'. Channels are formed into a face of substrates 40, 42 and 44 to form reformer 32, burner 30, boiler 34 and preferential oxidizer 50. A channel refers to a trench formed in the substrate. Each channel guides the movement of a gas or liquid passed therein. Silicon substrates 40, 42 and 44 permit the use of semiconductor fabrication techniques for the construction of fuel processor 15. In a specific embodiment, reformer channels 37, burner channels 31 and/or boiler channels 35 are formed in a silicon substrate using an etch process, such as a DRIE etch or a wet etch. In another embodiment, each substrate 40, 42 and 44 comprises a silicon alloy, silicon carbide, or a metal such as Stainless Steel, Titanium or Inconel. The metal facilitates heat transfer between burner 32 and reformer 30 and between burner 32 and boiler 34. MEMs manufacturing techniques such as layering and etching may also be used to fabricate substrates 40, 42 and 44 and channels disposed therein.

Figure 2B:
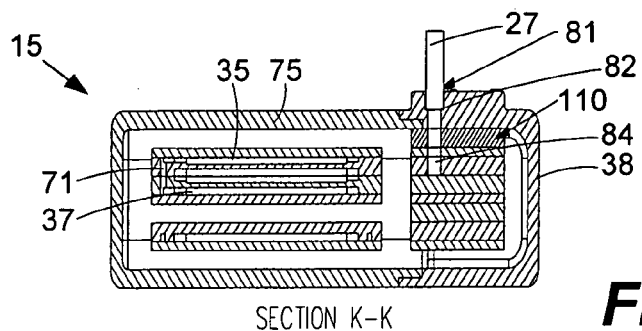
FIG. 2B illustrates a side cross section of the fuel processor of FIG. 2A taken through line K-K.

Referring to FIGS. 2B, 2G and 2J, boiler 34 heats methanol before reformer 32 receives the methanol. Boiler 34 comprises a set of boiler channels 35 disposed in a face 40a of substrate 40. A plate 41 attaches to face 40a and covers the open side of each channel 35. Boiler 34 includes a volume determined by the cumulative size of boiler channels 35 in the set.

Boiler 34 is disposed in proximity to burner 30 to receive heat generated in burner 30. In the embodiment shown, boiler channels 35 are disposed on an opposite face 40a of substrate 40 from the face 40b of substrate 40 including burner channels 31 (FIG. 2J). Heat then transfers 1) via conduction through substrate 40 from burner 30 to boiler 34 and 2) via convection from boiler channel 35 walls to the methanol passing therethrough. In one embodiment, boiler 34 is configured to vaporize liquid methanol. Gaseous methanol exiting boiler 34 then passes to reformer 32 for gaseous interaction with catalyst 102.

Boiler 34 receives methanol via fuel source inlet 81 (FIG. 2B), which couples to the methanol supply line 27 of FIG. 1B. Inlet 81 comprises a socket 82 disposed in a wall 128b of dock 38 and configured to receive a tube 27 that transports methanol to fuel processor 15. An inlet manifold 84 transports liquid methanol from socket 82 to substrate 40 and reformer channels 35 in substrate 40. Manifold 84 comprises an aperture or hole that passes through compliant material 110, substrates 40 and 42, and plate 41. Compression of material 110, substrates 40 and 42, and plate 41 by screw 126 seals manifold 84 between the components.

Reformer 32 comprises a set of reformer channels 37 disposed in a face 42b of substrate 42. A plate 49 attaches to face 42b and covers the open side of each channel 37. Reformer 32 includes a volume determined by the cumulative volume and size of reformer channels 37 in the set. More specifically, reformer 32 includes a segmented volume that includes contributions from multiple channels 37. In one embodiment, channels 37 are substantially rectangular in cross section. Channels 37 widths 37b from about 20 to about 400 microns are suitable for many applications. In a specific embodiment, channels 37 include a width 37b of about 100 microns. One or more aspect ratios may also be used to characterize the size of channels 37. A length 37c to width 37b ratio describes the planar area of channels 37 on the face of a substrate. Channels 37 having a length to width ratio from about 10000:1 to about 10:1 are suitable for many applications. In a specific embodiment, channels 37 include a length to width ratio of about 200:1. A depth 37a to width 37b ratio describes the cross sectional size of channels 37 along their length 37c. Channels 37 including a depth to width ratio from about 2:1 to about 100:1 are suitable for many applications. In a specific embodiment, channels 37 include a depth to width ratio of about 30:1. The set of channels includes at least one channel. The number and size of channels 37 for reformer 32 may vary with a desired hydrogen output for fuel processor 15, e.g., based on the production capacity of the fuel source and reformer catalyst 102.

Reformer 32 is configured to receive methanol after it has passed through boiler 34. Reformer 32 receives the methanol via conduit 71, which transports methanol output from channels 35 of boiler 34 to channels 37 of reformer 32 (FIG. 2B). More specifically, conduit 71 communicates methanol from face 40a of substrate 40, traverses through substrates 40 and 42, and opens to channels 37 on face 42b of substrate 42.

A catalyst 102 in reformer 32 facilitates the production of hydrogen. Catalyst 102 reacts with methanol 17 and facilitates the production of hydrogen gas and carbon dioxide. In one embodiment, catalyst 102 comprises a wash coat disposed over each channel 37. A wash coat of the desired catalyst may be sputtered or sprayed onto the substrate and etched back to maintain a flat surface 42b. The catalyst 102 then forms as thin layer over the walls of each channel 37. One suitable catalyst 102 includes CuZn when methanol is used as a hydrocarbon fuel source. Other materials suitable for catalyst 102 include platinum, palladium, a platinum/ palladium mix, and other precious metal catalysts for example. A combination of the following materials may also be used in catalyst 102: Cu, Zn, Pt, Ru, Rh, aluminum Oxides, calcium oxides, silicon oxides, and/or iridium.

Figure 2C:
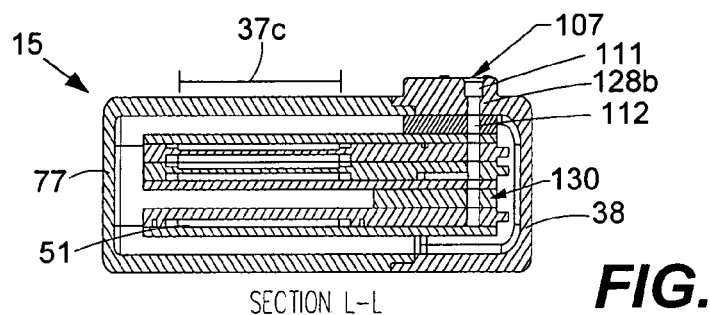
FIG. 2C illustrates a side cross section of the fuel processor of FIG. 2A taken through line L-L.

A preferential oxidizer 50 intercepts reformer 32 hydrogen exhaust and decreases the amount of carbon monoxide in the exhaust (FIG. 2G). Preferential oxidizer 50 comprises a set of oxidizer channels 51 disposed in a face 44b of substrate 44 (FIG. 2J). A plate 53 attaches to face 44b and covers the open side of each oxidizer channel 51. Preferential oxidizer 50 includes a volume determined by the cumulative size of boiler channels 51 in the set. Preferential oxidizer 50 employs oxygen from an air inlet 107 (FIG. 2C).

Air inlet 107 receives air from the ambient room and comprises a socket 111 and manifold 112. Socket 111 is disposed in a wall 128b of dock 38 and sized to receive a tube that transports air to fuel processor 15. Socket 111 opens to manifold 112, which transports the air to channels 51 in substrate 44. More specifically, manifold 112 traverses through compliant material 110, through plate 40, through substrates 42 and 40, through plate 49, through spacer 130 and through substrate 44 to open to channels 51. A catalyst 114 is wash coated onto the walls of channels 51 and may comprise one or a combination of the following materials: Cu, Zn, Pt, Ru, Rh, an aluminum oxide, a calcium oxide, a silicon oxide, iridium and/or another catalyst that is preferential to carbon monoxide over carbon dioxide.

Figure 2D:
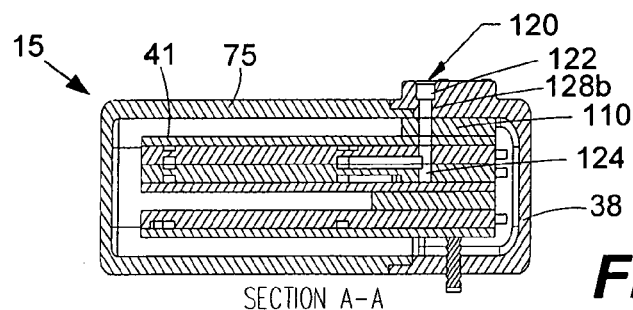
FIG. 2D illustrates a side cross section of the fuel processor of FIG. 2A taken through line A-A.
Figure 2E:
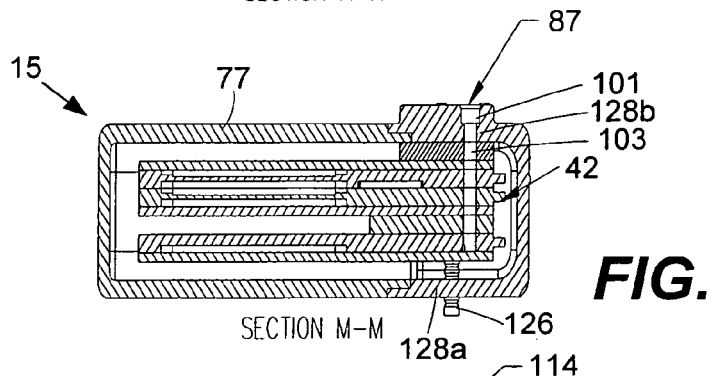
FIG. 2E illustrates a side cross section of the fuel processor of FIG. 2A taken through line M-M.

An outlet port 87 communicates hydrogen formed in reformer 32 outside of fuel processor 15 (FIG. 2E). In fuel cell system 10 of FIG. 1B, port 87 communicates hydrogen to line 39 for hydrogen provision to fuel cell 20. Port 87 is disposed in a wall of dock 38 and includes a socket 101 and manifold 103 that open through wall 128. Socket 101 is sized to receive a metal or plastic tube for line 39 for hydrogen communication from fuel processor 15. An adhesive may fix the tube to an inner wall of socket 101. Alternatively, a metal tube may be brazed to an inner wall of socket 101. When fuel processor 15 includes preferential oxidizer 50 as shown, manifold 103 transports hydrogen from preferential oxidizer 50, through substrate 44, through spacer 130, through plate 49, through substrates 42 and 40, through plate 40, through compliant material 110 and to socket 101 (FIG. 2B).

In another embodiment, preferential oxidizer 50 is not used in fuel processor 15 and reformer 32 is configured to directly output hydrogen from fuel processor 15. In this case, channels 37 in reformer 32 provide gas to manifold 103 for hydrogen communication from fuel processor 15. When fuel processor 15 does not include a preferential oxidizer, manifold 103 transports hydrogen from reformer channels 37 in substrate 42, through substrates 42 and 40, through plate 40, through compliant material 110 and to socket 101.

Hydrogen production in reformer 32 is slightly endothermic and draws heat from burner 30. Burner 30 generates heat and is configured to provide heat to reformer 32. Burner 30 comprises two sets of burner channels 31: a first set of channels 31a disposed in a face 42a of substrate 42 and a second set of channels 31b disposed in a face 40b of substrate 40. Substrates 40 and 42 are positioned and attached such that channels 31a and 31b on opposite faces 42a and 40b open to each other. Burner 30 includes a volume determined by the cumulative size of burner channels 31a and channels 31b.

Burner 30, boiler 34 and preferential oxidizer 50 each include a volume determined by the cumulative volume and size of channels in their respective channel set(s). Channel dimensions as described above with respect to reformer channels 37 may also be used for channels 35 of boiler 34, channels 31 of burner 30, and channels 51 of preferential oxidizer 50. Thus, channel widths, channel length to width ratios and channel depth to width ratios described above for channels 37 are also suitable for channels 35, channels 31 and channels 51.

In one embodiment, burner 30 employs catalytic combustion to produce heat. A catalyst 104 in burner 30 helps a burner fuel passed through the chamber generate heat. In one embodiment, methanol produces heat in burner 30 and catalyst 104 facilitates the methanol production of heat using methanol. Suitable methanol burner catalysts 104 may include platinum, palladium, iron, tin oxide, other noble-metal catalysts and reducible oxides. Other suitable catalyst 104 materials include one or a combination of the following materials: Cu, Zn, Pt, Ru, Rh, an aluminum oxide, a calcium oxide, a silicon oxide, and/or iridium. In another embodiment, waste hydrogen from fuel cell 20 produces heat in the presence of catalyst 104. Catalyst 104 is commercially available from a number of vendors known to those of skill in the art. In one embodiment, catalyst 104 comprises a wash coat disposed over each channel 31. A wash coat of the desired catalyst 104 may injected into the micro-channels using well known mixing, injection, evaporation and reduction methods. The catalyst 104 then forms as thin, porous and high surface area layer over the walls of each channel 31.

Figure 2F:
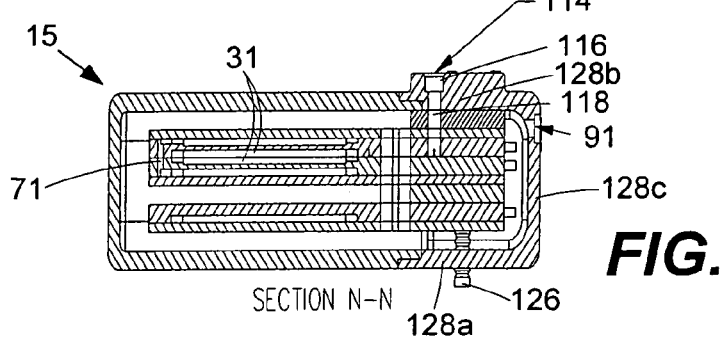
FIG. 2F illustrates a side cross section of the fuel processor of FIG. 2A taken through line N-N.

Burner 30 includes an inlet 114 that receives methanol 17 (FIG. 2F). Burner inlet 114 comprises a socket 116 disposed in a wall 128b of dock 38 and configured to receive a tube 27 (FIG. 1B) that transports methanol to fuel processor 15. A methanol inlet manifold 118 transports methanol from socket 116 to burner channels 31 in substrates 40 and 42.

Air including oxygen enters dock 38 via air inlet port 91 (FIG. 2F). Burner 30 uses the oxygen for catalytic combustion of methanol. A burner outlet port 120 (FIG. 2D) communicates exhaust formed in burner 30 outside of fuel processor 15. Burner outlet port 120 comprises a socket 122 disposed in a wall of dock 38 and configured to receive a tube that transports the exhaust away from fuel processor 15. A burner outlet manifold 124 transports the exhaust from channels 31 to socket 116.

Some fuel sources generate additional heat in burner 30, or generate heat more efficiently, with elevated temperatures. In one embodiment, fuel processor 15 includes a boiler that heats methanol before burner 30 receives the fuel source. In this case, the boiler receives the methanol via fuel source inlet 114. The boiler is disposed in proximity to burner 30 to receive heat generated in burner 30.

Burner 30 is configured to provide heat to reformer 32 and configured to provide heat to boiler 34. Disposing a set of burner channels 31a in substrate 42 allows heat generated in each burner channel 31a to transfer via conduction through substrate 42 to reformer 32 and channels 37 of reformer 32. The heat then conducts from substrate 42 in the vicinity of each channel 37 into catalyst 102. The heat may also convect into the channels 37 and heat the methanol. Disposing a set of burner channels 31b in substrate 40 allows heat generated in each channel 31b to transfer via conduction through substrate 40 to boiler 34 and channels 35 of boiler 34. Situating burner 30 and reformer 32 on the same chip and in close proximity to each other allows heat to flow directly from the burner catalyst 104 through a thin separating substrate 42, and into the reformer catalyst 102. Since the heat transfer is conducted from one catalyst structure, through a thin solid into the next catalyst microstructure, fuel processor 15 does need a large heat transfer area to transfer heat from burner 30 to reformer 32. This reduces the overall volume of fuel processor 15. Burner 30 need not include burner channels 31 in both substrate 40 and substrate 42. If only one substrate includes a set of burner channels 31, then heat may conduct from the substrate having the set of burner channels to the other substrate and then to boiler 34 or reformer 32.

Although fuel processor 15 has so far been described with respect to a catalytic burner 32, it is understood that some embodiments of the present invention may employ an electric burner 30 configured to provide heat to the reformer and configured to provide heat to the boiler. The electric burner 30 includes an resistive heating element that produces heat in response to input current. The electric burner 30 may be disposed between substrates 40 and 42 to provide conductive heat transfer to both substrates 40 and 42.

Plates 41, 49 and 53 cover and seal the open portion of channels in a substrate that the each plate neighbors. Each plate 41, 49 and 53 also increases mechanical strength of the chipset. Each plate 41, 49 and 53 may attach and bond to a substrate using a suitable adhesive, for example. In a specific embodiment, plates 41, 49 and 53 comprise glass, which has a low thermal conductivity when compared to silicon and reduces overall heat loss from fuel processor 15.

Dock 38 maintains position of reformer 32 and boiler 34 within fuel processor 15. Dock comprises screw 126, a set of dock walls 128, spacer 130, compliant material 110, and sockets 84, 111, 122, 101, and 116 for transport of process gases or liquids to and from reformer 32, burner 30 and boiler 34. Dock walls 128 include a securing wall 128a, wall 128b that opposes securing wall 128a and one or more side walls wall 128c that extend between securing wall 128a and wall 128b (FIG. 2C). Securing wall 128a includes a threaded hole for receiving screw 126. In place of screw 126, a spring may also be used to push the chipset against compliant material 110 and dock 38. Dock walls 128 combine to form an enclosure that partially surround a portion of reformer 32, boiler 34 and burner 30. Dock walls 128 may comprise, for example, mica glass, a ceramic, a glass filled polyester, or a metal such as copper.

Dock 38 applies a compliant securing force that passes through a portion of substrate 40 and a portion of substrate 42. Screw 126 threads through securing wall 128a, or the spring compresses, until it applies a compressive force onto plate 53. This compressive force locks substrates 40 and 42 and plates 41, 49 and 53 in place, and prevents them from shifting during handling. Wall 128b geometrically opposes securing wall 128a and provides a resistive force to the compressive force provided by screw 126 as it translates through components in the stack therebetween. A line 132 between where screw 126 meets plate 53 and wall 128b may be used to roughly describe a compressive force path between screw 126 and wall 128b (FIG. 2G). The compressive force generates in the threads of screw 126, transmits through a portion of plate 53 near where plate 53 meets screw 126, transmits through a portion of substrate 44 near line 132, through a portion of spacer 130 near line 132, through a portion of plate 49 near line 132, through a portion of substrate 42 near line 132, through a portion of substrate 40 near line 132, through a portion of plate 41 near line 132, through a portion of compliant material 110 near line 132, and to wall 128b. In this case, portions of substrates 40 and 42 affected by the compressive force of screw 126 comprise an end that nears where the compressive force propagates through the substrates. In one embodiment, substrates 40 and 42 and plates 41, 49 and 53 resemble cantilevered beams held together and in position via a compressive force applied by screw 126 (or spring).

Compliant material 110 intercepts the securing force provided by screw 126 and establishes an upper limit for the compliant securing force. As shown in FIG. 2D, compliant material 110 is disposed between plate 41 and wall 128b intercepts the securing force between plate 41 and wall 128b. Compliant material 110 includes a material of known and predetermined compliance that sets an upper limit for the compressive force applied by screw 126. In one embodiment, material 110 comprises a rigidity or elastic modulus less than the rigidity or elastic modulus of substrates 40 and 42. Compliance in material 110 then allows stresses onto substrates 40 and 42 to transfer onto material 110. This reduces localized stresses on substrates 40 and 42 and sets an upper limit for stresses on substrates 40 and 42. When substrates 40 and 42 comprise a brittle material such as silicon, material 110 prevents functional compromise of fuel processor 15 by increasing mechanical buffering and protection of substrates 40 and 42 to external stresses. By providing a mechanical buffer for forces onto substrates 40 and 42 and plates 41 and 49, compliant material 110 reduces translation of mechanical stress between substrates 40 or 42 and a tube attached into a socket in dock 38. Deformation of compliant material 110 may reduce also pressure variations in portions of substrates 40 and 42 near material 110. Compliant material 110 also reduces stresses induced between substrates 40 and 42 and plates 41 and 49 resulting from thermal expansion and contraction of each component, thus resulting in a more robust mechanical structure and increased protection for reformer 32, boiler 34 and burner 30. Materials suitable for use with compliant material 110 include high temperature silicone, Teflon, or any other material with a suitable compliance and ability to handle the elevated temperatures used in fuel processor 15. In a specific embodiment, the compliant material 110 comprises Grafoil as provided by GrafTech International of Wilmington Del.

In one embodiment, compliant material 110 acts as a gasket that seals the inlet and exit ports between plate 40 and the inside of wall 128b. In addition to sealing the gas streams, the gasket also thermally isolates the chipset from dock 38 and dewar 150 (see below), thereby reducing the overall heat loss from fuel processor 15.

Spacer 130 maintains separation of substrate 42 and substrate 44. This reduces heat transfer from substrate 42 to a cooler substrate 44 and permits more heat to remain in substrate 42 and transfer to reformer 32 (e.g., catalyst 102 or the methanol in channels 37). In one embodiment, spacer 130 comprises a rigid and low heat conductance material such as a ceramic. Alternatively, spacer 130 may comprise another layer of compliant material 110 to further control forces in fuel processor 15 and protect substrates 40 and 42 and plates 41 and 49.

Dock walls 128 provide mechanical protection for internal components of fuel processor 15 such as substrates 40 and 42, plates 41 and 49, reformer 32, burner 30 and boiler 34. Shell 75 attaches to dock 38 and also provides mechanical protection for internal components of fuel processor 15. Shell 75 includes a set of walls 77 that at least partially contain reformer 32, burner 30 and boiler 34. Walls 77 comprise a suitably stiff material such as a metal, ceramic or a rigid polymer, for example. Shell 75 may attach to dock 38 using an adhesive or via one ore more screws. Shell 75 and dock 38 collectively encapsulate reformer 32, burner 30 and boiler 34. As described below with respect to dewar 150, shell 75 and dock 38 may also contribute thermal management benefits for fuel processor 15.

Although fuel processor 15 includes a screw 126 to provide a compressive force, it is contemplated that other mechanical means may be used to apply a force to maintain position of the reformer and boiler within the fuel processor. For example, screw 126 may be replaced with a spring clip or shim configured to provide a compressive force onto a chipset.

Dock 38 also includes inlet and outlet ports for gaseous and liquid communication in and out of fuel processor 15. Via port 81 and socket 82 described above, dock 38 permits transport of methanol to reformer 32 from outside fuel processor 15 though wall 128b. Similarly, via port 87 and socket 101 described above, dock 38 permits transport of hydrogen from reformer to outside the fuel processor though a wall included in the dock. Dock 38 thus also provides gaseous and liquid interconnection for components held by dock 38.

A burner 30 in fuel processor generates heat and typically operates at an elevated temperature. Burner 30 operating temperatures greater than 200 degrees Celsius are common. Standards for the manufacture of electronics devices typically dictate a maximum surface temperature for a device. Electronics devices such as laptop computers often include cooling, such as a fan or cooling pipe, to manage and dissipate internal heat. A fuel processor internal to an electronics device that loses heat into the device calls upon the device's cooling system to handle the lost heat.

In another embodiment, fuel processors of the present invention include a dewar that improves thermal management of a fuel processor by reducing heat loss and increasing burner efficiency. FIG. 3A illustrates a side cross-sectional view of fuel processor 15 and movement of air created by dewar 150 in accordance with one embodiment of the present invention. FIG. 3B illustrates a front cross-sectional view of fuel processor 15 and demonstrates thermal management benefits gained by dewar 150. While thermal management techniques described herein will now be described as fuel processor components, those skilled in the art will recognize that the present invention encompasses methods of thermal management as described below.

In one embodiment, fuel processor 15 comprises a dewar 150 to improve thermal management for fuel processor 15. Dewar 150 at least partially thermally isolates components internal to housing 152—such as burner 30—and contains heat within fuel processor 15. Dewar 150 reduces heat loss from fuel processor 15 and helps manage the temperature gradient between burner 30 and outer surface of housing 152. And as will be described below, dewar 150 also pre-heats air before it is received by burner 30.

Dewar 150 at least partially contains burner 30 and reformer 32 and includes a set of dewar walls 154 that help form a dewar chamber 156 and a chamber 158. The set of walls 154 includes side walls 154a and 154c that combine with top and bottom walls 154b and 154d to form the rectangular cross section shown in FIG. 3B; and includes two end walls 154e and 154f that combine with top and bottom walls 154b and 154d to form the rectangular cross section shown in FIG. 3A. End wall 154f includes apertures that permit the passage of inlet and outlet ports 85, 87 and 89 therethough.

Dewar chamber 156 is formed within dewar walls 154 and comprises all space within the dewar walls 154 not occupied by monolithic structure 100. As shown in FIG. 3B, dewar chamber 156 boxes in shell 75 and dock 38. Chamber 156 comprises ducts between shell 75 and dock 38 and walls 154 on all four sides of dewar 150. In addition, chamber 156 comprises air pockets between end walls of dewar 150 and outside surfaces of end plates 82 and 84 on both ends of monolithic structure 100 (FIG. 3A).

Chamber 158 is formed outside dewar walls 154 between dewar 150 and housing 152. Chamber 158 comprises all space within housing 152 not occupied by dewar 150. As shown in FIG. 3B, housing 152 boxes in dewar 150 and the further internal shell 75 and dock 38. Chamber 158 comprises ducts between walls 154 on all four sides of dewar 150 and housing 152. In addition, chamber 158 comprises air pockets 167 between dewar 150 and housing 152 on both ends that prevent contact and conductive heat transfer between dewar 150 and housing 152 (FIG. 3A).

Dewar 150 is configured such that air passing through dewar chamber 156 receives heat generated in burner 30. Dewar 150 offers thus two functions for fuel processor 15: a) it permits active cooling of components within fuel processor 15 before the heat reaches an outer portion of the fuel processor, and b) it pre-heats the air going to burner 30. For the former, air moves through fuel processor 15 and across walls 154 of dewar 150 such that the cooler air absorbs heat from the warmer fuel processor 15 components.

As shown in FIG. 3A, housing 152 includes an air inlet port 91 or hole that permits the passage of air from outside housing 152 into air into chamber 158. A fan may provide the air to fuel processor 15 and pressurize the air coming through port 97. Top and bottom walls 154b and 154d include air inlet ports or holes 172 that allow air to pass from chamber 158 to dewar chamber 156. Air flow through fuel processor 15 then flows: in air inlet port 97, through chamber 158 along the length of the dewar 150, through holes 172 in walls 154b and 154d, through chamber 156 back along the length of the dewar 150 in the opposite direction as in through chamber 158, and into air inlet ports 91 that allow the air to enter burner 30. In chamber 158, the air a) moves across the outside surface of dewar walls 154 and picks up heat convectively from dewar walls 154, and b) moves across the inside surface of housing 152 and picks up heat convectively from the housing 152 walls (when housing 152 is at a greater temperature than the air). In chamber 156, the air a) moves across the outside surface of shell 75 and dock 38 and picks up heat convectively from the walls of shell 75 and dock 38, and b) moves across the inside surface of dewar 150 and picks up heat convectively from dewar walls 154.

Dewar 150 is thus configured such that air passing through the dewar receives heat generated in burner 30 via direct convective heat transfer from walls 77 and 128 in shell 75 and dock 38 to air passing through dewar chamber 156. Dewar 150 is also configured to such that air passing through chamber 156 receives heat indirectly from burner 30. Indirectly in this sense refers to heat generated in burner 30 moving to another structure in fuel processor 15 before receipt by the air.

Figure 3C:
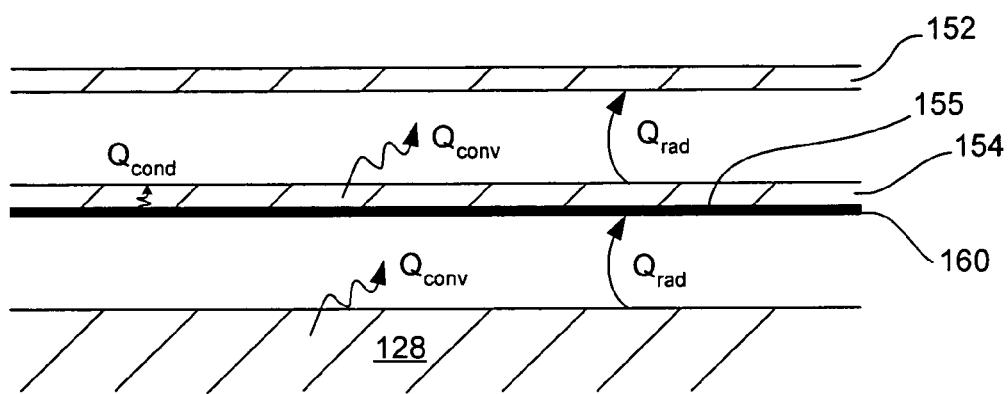
FIG. 3C shows a thermal diagram of the heat path produced by a dewar wall.

FIG. 3C illustrates a thermal diagram of the heat path produced by a wall 154 of dewar 150. Heat from burner 30 conducts through shell 75 and dock 38 to a surface that opens into dewar chamber 156. From here, the heat a) conducts into the air passing through dewar chamber 156, thereby heating the air; b) radiates to the inner wall 155 of dewar wall 154, from which the heat convects into the air passing through dewar chamber 156; c) radiates to the inner wall 155 of dewar wall 154, conducts through wall 154 to the outer surface 157 of dewar wall 154, from which the heat convects into the air passing through dewar chamber 158, and d) radiates to the inner wall 155 of dewar wall 154, conducts through wall 154 to the outer surface 157 of dewar wall 154, radiates to a wall of housing 152, from which the heat convects into the air passing through dewar chamber 158.

Dewar 150 thus provides two streams of convective heat dissipation and active air-cooling in volumes 156 and 158 that prevent heat generated in burner 30 (or other internal parts of fuel processor 15) from escaping the fuel processor.

Reflectance of heat back into chamber 156 decreases the amount of heat lost from fuel processor 150 and increases the heating of air passing through chamber 156. To further improve the radiative reflectance back into chamber 156, an inside surface of dewar wall 154 may include a radiative layer 160 to decrease radiative heat transfer into wall 154 (see FIGS. 3B or 3C). Radiative layer 160 is disposed on an inner surface 155 on one or more of walls 154 to increase radiative heat reflectance of the inner surface 155. Generally, the material used in radiative layer 160 has a lower emissivity than the material used in walls 154. Materials suitable for use with walls 154 of dewar 150 include nickel or a ceramic, for example. Radiative layer 160 may comprise gold, platinum, silver, palladium, nickel and the metal may be sputter coated onto the inner surface 155. Radiative layer 160 may also include a low heat conductance. In this case, radiative layer 160 may comprise a ceramic, for example.

When dewar 150 fully encapsulates shell 75 and dock 38, the dewar then bounds heat loss from the structure and decreases the amount of heat passing out of dewar 150 and housing 152. Fuel processors 15 such as that shown in FIGS. 3A and 3B are well suited to contain heat within housing 152 and manage heat transfer from the fuel processor. As mentioned above, shell 75 and dock 38 collectively encapsulate reformer 32, burner 30 and boiler 34. If air is routed within shell 75 and dock 38 before receipt by burner 30, then shell 75 and dock 38 may also contribute to thermal management as described with respect to dewar 150.

In one embodiment, burner operates at a temperature greater than about 200 degrees Celsius and the outer side of the housing remains less than about 50 degrees Celsius. In embodiments for portable applications where fuel processor 15 occupies a small volume, volumes 156 and 158 are relatively small and comprise narrow channels and ducts. In some cases, the height of channels in volumes 156 and 158 is less than 5 millimeters and a wall of burner 30 on monolithic structure is no greater than 10 millimeters from a wall of housing 152. The thermal benefits gained by use of dewar 150 also permit the use of higher temperature burning fuels as a fuel source for hydrogen production, such as ethanol and gasoline. In one embodiment, the thermal management benefits gained by use of dewar 150 permit reformer 32 to process methanol at temperatures well above 100 degrees Celsius and at temperatures high enough that carbon monoxide production in reformer 32 drops to an amount such that a preferential oxidizer is not needed.

As mentioned above, dewar 150 offers a second function for fuel processor 15 by pre-heating the air going to a burner. Burner 30 relies on catalytic combustion to produce heat. Oxygen in the air provided to burner 30 is consumed as part of the combustion process. Heat generated in the burner 30 will heat cool incoming air, depending on the temperature of the air. This heat loss to incoming cool air reduces the heating efficiency of burner 30, and typically results in a greater consumption of methanol. To increase the heating efficiency of burner 30, the present invention heats the incoming air so less heat generated in the burner passes into the incoming air. In other words, chambers and air flow formed by dewar 150 allow waste heat from the burner to pre-heat air before reaching the burner, thus acting as a regenerator for fuel cell 15.

While fuel processor 15 of FIGS. 3A and 3B shows dewar 150 encapsulating shell 75 and dock 38, the present invention may also employ other architectures for dewar 150 and relationships between burner 30 or reformer 32 and dewar 150 that carry out one or both of the dewar functions described above. In another embodiment, dewar 150 comprises a spiral wall that elongates the convective path for cool air flow over a warmer dewar wall.

Figure 3D:
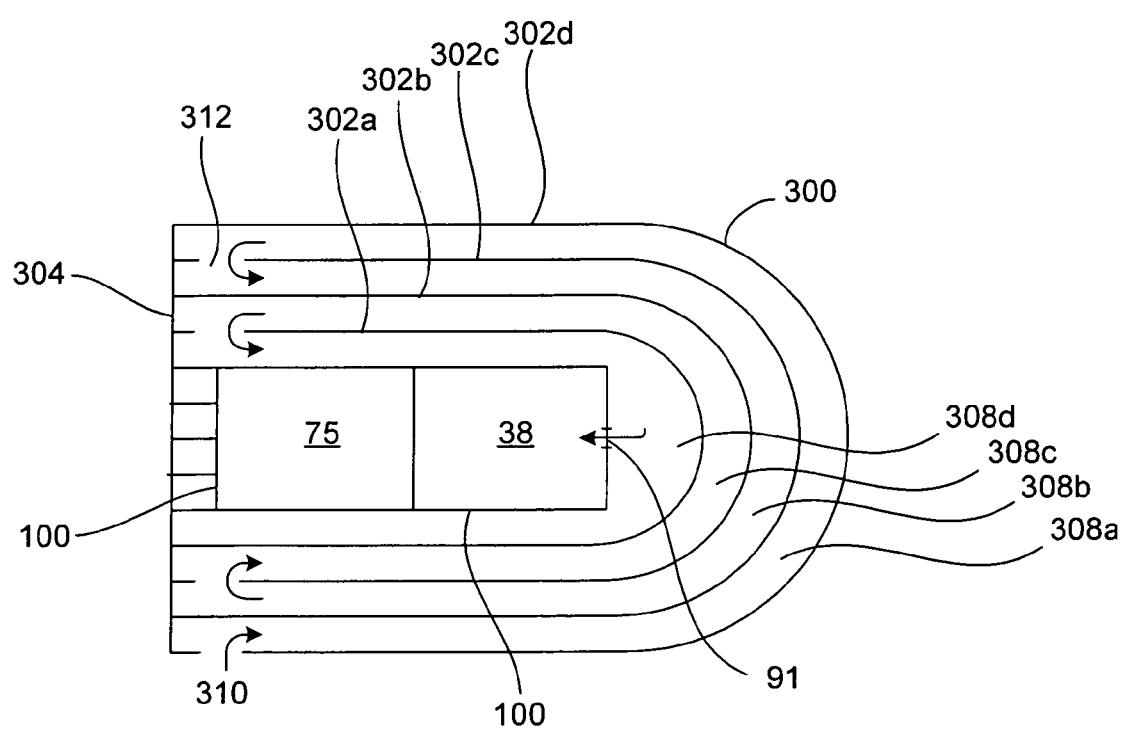
FIG. 3D illustrates a dewar in accordance with another embodiment of the present invention.

FIG. 3D illustrates a cross sectional view of a multipass dewar 300 in accordance with another embodiment of the present invention. Dewar 300 comprises four dewar walls 302a-d that connect to a housing wall 304. Dewar wall 302a and housing wall 304 enclose monolithic structure 100, which includes burner 30. Dewar wall 302b and housing wall 304 enclose dewar wall 302a and burner 30. Similarly, dewar wall 302c and housing wall 304 enclose dewar wall 302b, while dewar wall 302d and housing wall 304 enclose dewar wall 302c. Dewar walls 302a-d form four volumes for incoming air to pass over warmer walls and receive heat. Air enters dewar inlet port 310 and flows through dewar chamber 308a and into dewar chamber 308b through port 312 after travelling through substantially the whole chamber 308a. Air then serially passes into and through chambers 308c and 308d before entering burner inlet 314.

While this invention has been described in terms of several preferred embodiments, there are alterations, permutations, and equivalents that fall within the scope of this invention which have been omitted for brevity's sake. It is therefore intended that the scope of the invention should be determined with reference to the appended claims.

What is claimed is:

1. A fuel processor for producing hydrogen from a fuel source, the fuel processor comprising:
    a reformer including a set of reformer channels disposed in a first substrate and including a reformer catalyst that facilitates the production of hydrogen from the fuel source;
    a boiler including a set of channels disposed in a second substrate and configured to heat the fuel source before the reformer receives the fuel source;
    a burner configured to provide heat to the reformer and configured to provide heat to the boiler;
    a dock having a securing member only on a first wall of the dock, the securing member configured to maintain position of the reformer and boiler within the fuel processor by applying a compliant securing force from the first wall that passes through a portion of the first substrate and a portion of the second substrate; and
    a compliant material that intercepts the complaint securing force and establishes an upper limit for the compliant securing force, wherein the reformer channels and the boiler channels are not in contact with the compliant material.

2. The fuel processor of claim 1 wherein the securing member is a screw that threads through a threaded hole in a first wall of the dock.

3. The fuel processor of claim 2 further comprising a compliant material disposed between the first wall and a dock wall that opposes the first wall, wherein the compliant material intercepts a securing force provided by the screw and establishes an upper limit for the securing force.

4. The fuel processor of claim 3 wherein the compliant material reduces pressure variation in the portion of the first substrate.

5. The fuel processor of claim 1 wherein the dock is configured to permit transport of hydrogen from the reformer to outside the fuel processor though a wall included in the dock.

6. The fuel processor of claim 1 wherein the dock is configured to permit transport of the fuel source to the reformer from outside the fuel processor though a wall included in the dock.

7. The fuel processor of claim 6 wherein the dock comprises a socket that opens to a manifold that transports a gas or fluid between socket and the reformer.

8. The fuel processor of claim 7 wherein the socket is configured to receive a tube that transports the fuel source to the fuel processor.

9. The fuel processor of claim 8 wherein the dock is configured to reduce translation of mechanical stress between the tube and the first substrate.

10. The fuel processor of claim 1 further comprising a plate disposed adjacent to the first substrate and configured to cover the reformer channels.

11. The fuel processor of claim 1 further comprising a shell attached to the dock, wherein the dock and shell collectively encapsulate the reformer, boiler and burner.

12. The fuel processor of claim 1 wherein the first substrate comprises silicon, silicon alloy, or a metal.

13. The fuel processor of claim 12 wherein the reformer channels are formed in the silicon or metal using an etch process.

14. The fuel processor of claim 1 wherein the reformer catalyst comprises a wash coat disposed over the reformer channels.

15. The fuel processor of claim 1 wherein the reformer channels comprise a width between about 20 microns and about 400 microns.

16. The fuel processor of claim 1 wherein the reformer channels comprise a depth to width ratio from about 2:1 to about 100:1.

17. The fuel processor of claim 1 wherein the burner is a catalytic burner including a catalyst that facilitates the production of heat using the fuel source.

18. A fuel processor for producing hydrogen from a fuel source, the fuel processor comprising:

a reformer including a set of reformer channels disposed in a first substrate and including a reformer catalyst that facilitates the production of hydrogen from the fuel source;

a boiler including a set of channels disposed in a second substrate and configured to heat the fuel source before the reformer receives the fuel source;

a catalytic burner including a catalyst that facilitates the production of heat using the fuel source, configured to provide heat to the first substrate and the second substrate, and including a set of channels disposed in one of the first substrate and the second substrate;

a dock having a securing member only on a first wall of the dock, the securing member configured to maintain position of the reformer and boiler within the fuel processor and configured to apply or receive a securing force at a first wall of the dock, wherein the securing force passes through a portion of the first substrate and a portion of the second substrate; and a compliant material disposed between the first wall and a dock wall that opposes the first wall, wherein the compliant material intercepts the securing force and establishes an upper limit for the securing force.

19. The fuel processor of claim 18 wherein the burner catalyst comprises a wash coat disposed over the burner channels.

20. The fuel processor of claim 18 wherein the first substrate comprises silicon, silicon alloy, or a metal.

21. The fuel processor of claim 20 wherein the burner channels are formed in the silicon, silicon alloy, or a metal using an etch process.

22. The fuel processor of claim 18 wherein the burner channels comprise a width between about 20 microns and about 400 microns.

23. The fuel processor of claim 18 wherein the burner comprises a wash coat disposed over the burner channels.

24. The fuel processor of claim 18 wherein the burner channels comprise a depth to width ratio from about 2:1 to about 100:1.

25. The fuel processor of claim 18 further comprising a second set of burner channels disposed in the other of the first substrate and the second substrate.

26. The fuel processor of claim 25 wherein the first substrate and the second substrate are arranged in contact with each other and channels in the first set of burner channels open to channels in the second set of burner channels.

27. The fuel processor of claim 18 wherein the compliant material reduces pressure variation in the portion of the first substrate.

28. The fuel processor of claim 18 wherein the dock comprises a screw that threads through a threaded hole in a first wall of the dock and applies the securing force.

* * * * *

UNITED STATES PATENT AND TRADEMARK OFFICE
CERTIFICATE OF CORRECTION

| | | |
|---|---|---|
| PATENT NO. | : 7,462,208 B2 | Page 1 of 1 |
| APPLICATION NO. | : 10/877804 | |
| DATED | : December 9, 2008 | |
| INVENTOR(S) | : Ian W. Kaye | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1119 days.

Signed and Sealed this

Fifteenth Day of February, 2011

David J. Kappos
*Director of the United States Patent and Trademark Office*